$t_{Fab} \leq t_P$ ; $t_{Fab} \leq \frac{1}{2} t_J$ ; $t_{Fsp} \leq t_{FJ} - 3t_{Fab}$

| | e | m1 | m2 | a1 | a2 |
|---|---|---|---|---|---|
| 1 | 0 | 0 | 0 | 0 | 0 |
| 2 | 0 | 0 | 1 | 0 | 1 |
| 3 | 0 | 1 | 0 | 0 | 0 |
| 4 | 0 | 1 | 1 | 0 | 0 |
| 5 | 1 | 0 | 0 | 1 | 0 |
| 6 | 1 | 0 | 1 | 0 | 1 |
| 7 | 1 | 1 | 0 | 0 | 1 |
| 8 | 1 | 1 | 1 | 1 | 1 |

| m1' | m2' | a1' | a2' | ad |
|---|---|---|---|---|
| 0 | 0 | 0 | 0 | 0 |
| 0 | 1 | 1 | 1 | 1 |
| 1 | 0 | 1 | 0 | 0 |
| 1 | 1 | 1 | 1 | 0 |

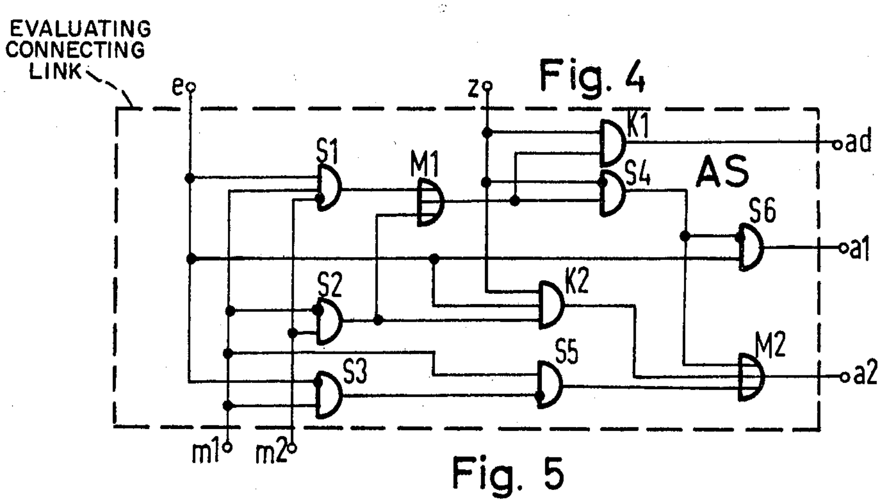
Fig. 4
Fig. 5
| | | | | | | | | | | | | | | | | |
|---|---|---|---|---|---|---|---|---|---|---|---|---|---|---|---|---|
| Z | 0 | 0 | 0 | 0 | 0 | 0 | 0 | 0 | 1 | 1 | 1 | 1 | 1 | 1 | 1 | 1 |
| e | 0 | 0 | 0 | 0 | 1 | 1 | 1 | 1 | 0 | 0 | 0 | 0 | 1 | 1 | 1 | 1 |
| m1 | 0 | 0 | 1 | 1 | 0 | 0 | 1 | 1 | 0 | 0 | 1 | 1 | 0 | 0 | 1 | 1 |
| m2 | 0 | 1 | 0 | 1 | 0 | 1 | 0 | 1 | 0 | 1 | 0 | 1 | 0 | 1 | 0 | 1 |
| a1 | 0 | 0 | 0 | 0 | 1 | 0 | 0 | 1 | 0 | 0 | 0 | 0 | 1 | 1 | 1 | 1 |
| a2 | 0 | 1 | 0 | 0 | 0 | 1 | 1 | 1 | 0 | 0 | 0 | 0 | 0 | 1 | 1 | 1 |
| ad | 0 | 0 | 0 | 0 | 0 | 0 | 0 | 0 | 0 | 1 | 0 | 0 | 0 | 1 | 1 | 0 |
| | 1 | 2 | 3 | 4 | 5 | 6 | 7 | 8 | 9 | 10 | 11 | 12 | 13 | 14 | 15 | 16 |
Fig. 6
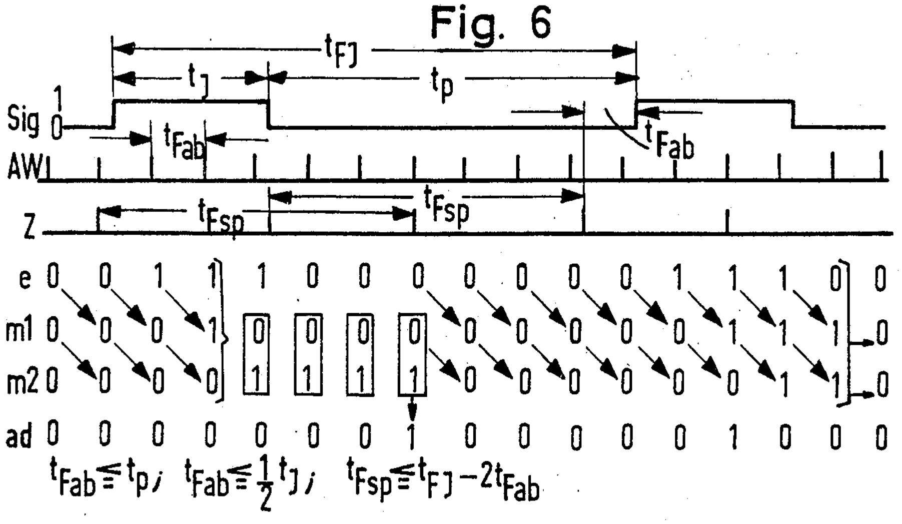

3,483,328

METHOD FOR REGISTERING SIGNAL PULSES OCCURRING ON A SIGNAL LINE IN RANDOM SEQUENCE

Ullrich Tanke, Grafelfing, near Munich, Germany, assignor to Siemens Aktiengesellschaft, Munich, Germany
Filed Oct. 15, 1965, Ser. No. 496,579
Claims priority, application Germany, Oct. 21, 1964, S 93,811, S 93,812
Int. Cl. H04m 15/00
U.S. Cl. 179—7 17 Claims

ABSTRACT OF THE DISCLOSURE

A system for central registration of signal pulses, such as rate pulses in telephone installations, which arrive in a random fashion on a plurality of signal lines. The pulses on each line are temporarily stored in bistable storage elements, which are themselves cyclically scanned by interrogating pulses. The results of successive scannings are compared in accordance with the so-called "last-look" principle, and only transitions from a signal to a no-signal condition, or vice-versa, are responded to. The central recording apparatus, which normally operates at much slower speed than the line monitoring apparatus, changes the digit combinations stored in the storage elements for each line, to a condition indicating continuation of the preceding signal condition, whenever the signal pulse is recognized and registered.

The present invention relates to a method for registering signal pulses occurring on a signal line in a random sequence or fashion. More particularly, the invention relates to registering metering or timing pulses in telephone communication systems.

Such metering or timing pulses, although they occur in a random fashion, have a given minimum duration. These pulses may be tariff or rate pulses in a telephone communication system and they are identified by periodically checking the signal lines for their signal status or condition in accordance with the so-called "Last Look Principle," applied by comparing the checking or scanning results of at least three successive scanning cycles. The identified signal pulses are then stored in a respective storage element provided individually for each line. The storage elements are also scanned periodically, but less frequently than the signal lines, said storage elements being reset to produce control signals which are then stored in a central recording device in the form of registering pulses.

It is known in the art to continuously scan individual signal lines in a cyclic sequence for the purpose of identifying or registering signal pulses which occur on these lines in a random fashion and which have a given minimum time spacing and a determined minimum duration. Such scanning is usually effected by means of coincidence gates, for example, diode AND gates, which are sequentially rendered conductive. The resulting pulse trains appearing at the output of each coincidence gate directly represent the signal condition of the monitored line, provided that the repeated scanning of each coincidence gate is effected rapidly enough. However, this direct representation is only possible if all signal lines are scanned once during the signal pulses of shortest duration. Satisfying this timing condition gives rise to the possibility that one and the same signal pulse is counted several times. In order to eliminate such possibility, a criterion for actually registering a signal pulse is ascertained in accordance with the above "Last Look" principle. According to this principle, each scanning result is temporarily stored for the duration of a scanning cycle in a storage element provided for each individual line. Such stored scanning result is then compared with the next following scanning result. The transition of a line from a non-signalling condition or status to a signalling condition or status and vice versa is characteristic of each signal pulse. Therefore, recording of a signal pulse takes place, depending upon the nature of the comparing circuit, only upon occurrence of an ascertainable status transition in one or the other direction.

In view of the above, the scanning results of two scanning cycles which follow each other, are necessary for identification of registeration criterion. Moreover, in order to surely ascertain the two possible signal conditions of the signal lines to be monitored, it is necessary that the time spacing between scanning pulses is neither longer than the duration of the shortest signal pulse to be ascertained, nor longer than the duration of the shortest following signal interval.

The individual signal pulses may be registered in such manner that the counting or reading of a scanning device is stored, instead of a signal pulse, in an automatically readable storage medium. Where a storage device is used which comprises storage sections assigned to each individual line, it is possible to retrieve the information relating to each individual line, in response to the position of the scanning device, and then to store such information again. In such instance the retrieved information is stored again, either changed or unchanged, depending upon the presence of a control signal. A change in the information could, for example, be effected by adding a "1."

There are two possibilities of cooperation between the scanning device and a registering or recording device, regardless of the mode of registration. In one instance, scanning takes place in synchronism with an operating or processing cycle of the registering or recording device, regardless of whether the entire apparatus operates continuously, or merely upon request, when a signal pulse is present. In the other instance, wherein the scanning speed is greater than the processing speed, registering instructions derived from the scanning operation are first stored in a buffer memory provided individually for each line. The slower operating registering device then retrieves the instructions from the buffer memory. The latter instance has the advantage that the scanning of the individual signal lines and the processing of the resulting registering instructions are separated from each other. As a result, a substantially larger number of signal lines may be monitored, by including a substantial portion of the interval time following each signal pulse, in such monitoring, while the pulse-interval ratio of the signal pulses to be identified remains the same.

In view of the above, it is an important object of the invention to simplify such methods in which, in order to ascertain individual registering instructions, at least two memory elements are necessary for each individual line for intermediate storage of the line conditions ascertained in two successive cycles.

It is a further object of the invention to reduce or even eliminate the number of memory elements which were heretofore required for such intermediate storage of the registering instructions.

Another object of the invention is realized in employing the memory elements which are provided for each individual line, and which are necessary for identification of signal pulses, directly for the purpose of marking or designating a registering instruction.

A still further object of the invention is to utilize the fact that, in ascertaining registering instructions according to the "Last Lock Principle," one of two status transitions (e.g., "0"–"1" or "1"–"0") which may take place in two different directions, is evaluated, whereas the status transition in the opposite direction is of no significance.

Still another object of the invention resides in the utilization of the characteristic digit combination (e.g., "0"–"1") which is temporarily not required for signal pulse identification for the purpose of designating a control instruction which is related to a signal pulse. Such control instruction may, for example, be a registering instruction. The above utilization is possible because the two digit combinations which designate the two status transitions are equally characteristic for each signal pulse and they occur but once for each signal pulse.

It is also an object of the invention to make certain that said temporarily-not-required-characteristic-digit-combination is not stored when it occurs during line scanning, so as to avoid simulating a registering instruction.

It is yet another object of the invention to prevent multiple counting of the same signal pulse.

It is also an object of the invention to prevent different scanning cycles from coinciding with the same signal pulse.

Another object of the invention is to utilize the same scanning device for several purposes.

Briefly, according to the invention, there is provided a modification of the last-look-principle, wherein at the time of recognition of a signal pulse in the memory elements which serve for the intermediate storage of the line conditions, the non-utilized combination of the two combinations which make said recognition of a signal pulse possible, is kept stored until final processing by a central recording device (e.g., by increasing the count recorded therein) whereas upon occurrence of such non-utilized combination during the line scanning or monitoring operation, a digit combination is stored which designates the subsequent line condition.

The cycle duration of said central recording device, during which the memory elements containing the line conditions are to be scanned at least once, must be determined with regard to the fact that with a "last look" extending over $n$ scanning cycles, the recognition of a signal pulse is only possible—in the least desirable case—at the end of the $n-1$th scanning cycle after the beginning of the signal pulse.

On the other hand, it is necessary that the memory elements which contain the line conditions in successive scanning cycles, are again timely available for performing their inherent task (recording line condition) in order that the next-following signal pulse may be positively identified. However, in the case of a non-synchronous evaluation of the information contained in the memory elements of each line, for line monitoring on the one hand and for registering on the other, this is only possible if a stored registering instruction is scanned at a time prior to the following signal pulse, such time corresponding at least to the duration of a full scanning cycle. In this instance, the maximum permissible duration of a processing cycle corresponds to the shortest probable pulse spacing time between signal pulses to be registered, said duration being shortened or reduced by $n$ scanning cycles.

Contrary to the above, in the case of synchronous evaluation, the duration of a processing cycle is prolonged by one scanning cycle. Analogous considerations apply where the trailing edges of signal pulses are evaluated.

Where it is desired that the influence of noise must be suppressed as much as possible, it is necessary to further shorten the processing cycle by the duration of an additional scanning cycle, in order that at least one of two successive scanning pulses will indicate that signal condition of the two possible signal conditions on a line, which causes recognition of a signal pulse.

Furthermore, in the case of non-synchronous evaluation of the information contained in the memory elements of each line and pertaining to line monitoring and registering, it must be made certain that the scanning of the memory elements by the recording device and the scanning which takes place independently for the purpose of line monitoring, do not interfere with each other.

Since the line monitoring operation usually must meet the more stringent conditions, it would appear to be useful to interrupt the processing cycle for the duration of any overlap. The resulting loss of time is to be considered in determining the duration of the processing cycle.

In such instances multiple counting of the same signal pulse must be avoided. Such counting may result, for example, from the fact that several scanning cycles, in addition to the "Last Look Cycle," may coincide with the same signal pulse. This coincidence is possible due to varying signal pulse durations, in spite of utilization of the maximum possible spacing of the scanning pulses, which spacing is determined by the signal pulse having the shortest probable duration.

In order to avoid such coincidence or double counting, it is another feature of the invention that a digit combination which indicates a signal pulse to be registered and which is extinguished upon scanning by the central recording device, is replaced by a digit combination which characterizes the continuance of a signal pulse (e.g., "O"–"O" or "1"–"1"). This feature of the invention may be employed regardless whether the leading or trailing edge of a signal pulse is evaluated.

According to a further feature of the invention it is possible to simultaneously use the scanning device which serves for line monitoring, also as the scanning device for channelling registration instructions stored in the memory elements of each line to said slower operating central recording device. This double use of the scanning device is accomplished according to the invention by the following procedures: (1) the signal lines to be monitored and the memory elements assigned to such lines are divided into groups in such manner that the duration of the processing of a signal registration instruction by the recording device corresponds to the period of time required to monitor the number of signal lines comprised in one group; (2) information words assigned to signal lines of like designation in all groups are also divided into groups, each of which comprises a number of information words corresponding to the number of line groups; (3) during the cyclic scanning of all line groups, respective word groups are evaluated sequentially, while during the processing of the $x-1$th word of a group the $x$th line group is being scanned; and (4) upon the presence of a registration instruction for the information word next to be processed, such instruction is extinguished during the scanning of the corresponding signal line and stored in an input storage of the recording device until the beginning of the next processing operation.

In the above manner, synchronism is also established between the scanning cycle and the processing cycle. In distinction to the known method, the present synchronism relates to a group of lines which are scanned or interrogated during the processing of a signal information word, while the information words relating to a group of signal lines follow each other in sequence from one scanning cycle to the other.

If there are $m$ lines per group, the information words are again ready for processing after $m$ scanning cycles. Accordingly, the advantages of the known method, which operates without synchronism between scanning and processing operations, are fully utilized. Due to the fact that the scanning operation precedes the processing operation by the time required for processing of an information word, it is assured that the memory element which is to be checked in the course of a processing cycle, and which may have stored therein a registering instruction, is always the memory element toward which the scanning is headed in the course of the scanning cycle for monitoring of the line, immediately prior to the time when needed for information processing.

It is possible in simple fashion to retrieve a possibly stored registration instruction and to store it temporarily until the beginning of the information processing operation, without interfering with the scanning cycle of the line monitoring operation. This is so, because only the memory element of a single signal line is to be monitored for each line group, more specifically, always that memory element is to be monitored whose information word is ready for processing upon initiation of scanning of the next-following line group. This feature of the invention has the advantage that extra scanning means for calling up the resulting registration instructions, become unnecessary. The correlation between a registration instruction which is temporarily stored in a memory element of a line, and an information word, is solely assured by the grouping to be maintained and by the synchronism between the line group just to be scanned and the respective information word which stands ready for information processing.

Another advantage of the invention is that it is quite possible that a registration instruction resulting from the scanning of a signal line be fed directly to the input storage of the recording device if, by chance, the information word next to be processed is the information word assigned to the signal line which has just been checked or scanned.

Blocking gate S3 monitors the occurrence of a digit combination representing a registration instruction occurring during normal line scanning. Blocking gate S3 then blocks gate S5, when no signal appears on line *e*, so that digit combination "0–1" appears at outputs *a*1 and *a*2. Digit combination "0—0" indicates the continuance of an already recognized line condition.

In instances which are characterized by rows 1, 5 and 8 of the logic-plan of FIG. 3, output *a*1 is directly responsive to the signal condition on line *e*, by operation of blocking gate S4, whereas instructions occurring at input *m*1 are directly fed to output *a*2 through mixing OR gate M1 and blocking gate S5 in the course of the normal "Last-Look-Method."

The signals which appear at outputs *a*1 and *a*2 of evaluating link AS1 are fed by means of selector arms III and IV of scanning selector AWM to the memory elements of each individual line wherein the signals are temporarily stored until the next following scanning, whereupon the signals are fed back as new input signals to inputs *m*1 and *m*2 of circuit link AS1.

Independently of the information circulating through scanning selector AWM, further information circulates through selector arms I and II, as well as through selector arms III and IV of scanning selector AWZ. The information content of the individual line memory elements which are scanned by selector arms I and II are fed to inputs *m*1' and *m*2' of further evaluating connecting link AS2. The designations of inputs *m*1' and *m*2' have been chosen in analogy to inputs *m*1 and *m*2 of link AS1.

Link AS2 is a simple blocking, or AND gate S6 which checks whether a digit combination representing a registration instruction has been stored; if so, then a respective adding instruction is fed through output *ad* to adder AD. Adder AD receives the content of central recording device ZSP in synchronism with the scanning position of selector AWZ and restores such content in recording device ZSP after increasing it by one unit in accordance with the output on line *ad*.

The output of blocking gate S6 is also connected through mixing OR gate M2 to output *a*1' in order to erase a presently-existing registering instruction, while output *m*2' is connected as output *a*2' to the storage unit MSP. As a result, and in accordance with row 2 of the right hand logic-plan of FIG. 3 the new digit combination "1—1" is stored instead of the "0–1" digit combination received through inputs *m*1' and *m*2', in the individual line memory elements of storage unit MSP. In the remaining instances according to rows 1, 3 and 4 of the logic plan of FIG. 3 the received digit combination will be re-stored unchanged.

All scanning operations and the cooperation of the individual information circulation circuits are controlled in a known manner by central control apparatus *Ab–St*. This control applies particularly to the synchronization between the central recording device and scanning selector AWZ, as well as to prevention of simultaneous scanning of the same memory elements of storage unit MSP by means of scanning selectors AWM and AWZ. Incidentally, the details of the individual circuits have not been described in detail since such details are optional, and in accordance with well known design techniques, provided that the required functions are fulfilled.

FIG. 2 shows a pulse diagram relating to FIG. 1. The first or top pulse curve *Sig* represents the signal voltage on any signal line. The second pulse train corresponds to the scanning sequence of scanning selector AWM. The third pulse train represents the scanning sequence of scanning selector AWZ of the recording device. Underneath the pulse trains there are shown the input signals appearing on line *e* and at inputs *m*1 and *m*2 of evaluating circuit AS1. The bottom row shows the adding instructions appearing at output *ad* of further evaluating circuit AS2.

As long as the monitored signal line is in signal status "0," a scanning pulse causes a "0" representing signal to appear as a result on line *e*. When the line is in signal satus "1" the result on line *e* is a "1" representing signal. After the fourth scanning operation, the digit combination which causes a registering instruction is fulfilled, as indicated in row 7 of the logic-plan of FIG. 3. Accordingly, as a modification of the "Last-Look" principle, the digit combination "0–1" which is not required for recognizing a signal pulse, is stored in the individual line memory elements. This combination is preserved until, after the seventh scanning pulse, the recording device performs the operation which results in the adding instruction "1." As a result of the completed recording operation, the stored registration instruction will be erased and instead the digit combination "1—1" will be stored in the individual line memory elements. Since the subsequent line scanning will provide the result "0," the usual information shifting of the "Last-Look" method would cause storage of a digit combination simulating a registration instruction. Therefore, the "Last-Look" method has been modified so that instead of a digit combination simulating a registration instruction, the digit combination "0—0" is stored according to row 4 of the logic-plan of FIG. 3.

Thereafter, the "Last-Look" principle will be fully performed until again a digit combination is present which causes a registration instruction in accordance with row 7 of the logic-plan of FIG. 3. Such digit combination occurs when the second pulse falls within the following signal pulse and causes storage of the digit combination "1–0." The immediately following scan by the recording device again results in an adding instruction "1," and in modifying the digit combination to "1—1." The modified digit combination "1—1" is preserved until the first scanning pulse, which falls into the following interval, furnishes as a result a "0" whereby the complete erasure of the existing digit combination is accomplished.

It can further be seen from the pulse diagram of FIG. 2 that, in the most disadvantageous instance, a signal pulse will be recognized only immediately before the end of two scanning cycles $t_{Fab}$. This time period (of almost two scanning cycles) is, therefore, lost for the operating cycle $t_{Fsp}$ of the recording device. On the other hand, the recognition of a signal pulse is possible only if, prior to the beginning of the signal pulse, the scanning result "0" has been obtained. Therefore, the processing of a registration instruction must be completed for a period corresponding to the duration $t_{Fab}$ of a scanning cycle, before the beginning of a signal pulse. It follows that the total permissible duration $t_{Sp\ max}$ of the cycle of the recording device is equal to:

It is another feature of the invention to control in simple fashion the feeding of the individual registration instruction to the input storage of the recording device, by a control instruction which is produced in response to the fact that two counters exhibit the same count. Each counter has a number of outputs corresponding to the number of signal lines in a group. One of the counters is advanced or stepped in synchronism with the scanning of the individual signal lines, while the other counter is stepped upon initiation of each scan of the last line group.

In order that the invention may be clearly understood, it will now be described, by way of example, with reference to the accompanying drawings, wherein:

FIG. 4 shows an evaluating circuit means for synchronous evaluation according to the invention;

FIG. 5 is a logic-plan diagram pertaining to FIG. 4;

FIG. 6 is a pulse diagram pertaining to FIGS. 4 and 5; and,

Figure 1:
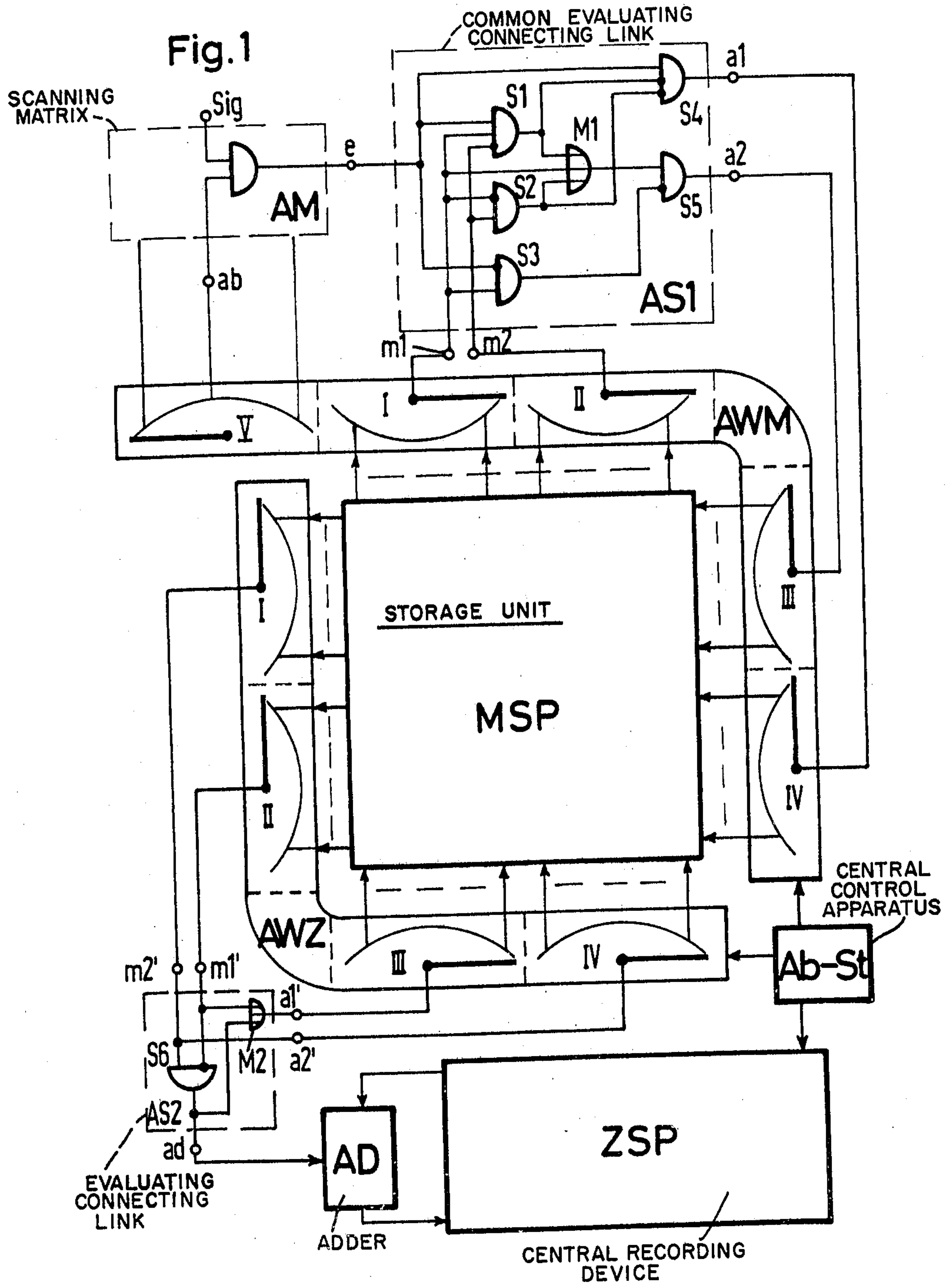
FIG. 1 is a block diagram of a circuit arrangement for performing the method of the invention, and including a special scanning device for feeding the temporarily stored registration instructions to a slower operating central recording device.

FIG. 1 shows in its upper portion scanning matrix AM with scanning selector AWM for synchronous scanning of the individual signal lines. The memory elements required for performing the "Last-Look-Method," which are provided individually for each line to temporarily store the line conditions ascertained in two successive scanning cycles, are comprised in storage unit MSP. Scanning matrix AM and the memory elements of storage unit MSP are coupled together through common evaluating connecting link AS1 and scanning selector AWM. The lower portion of FIG. 1 shows a further scanning apparatus AWZ for storage unit MSP. Scanning apparatus AWZ is coupled through further evaluating connecting link AS2 to a recording device comprising adder AD and recording device ZSP.

The individual signal lines *Sig* to be monitored by the apparatus of FIG. 1 are connected to coincidence or AND gates arranged in matrix AM. These coincidence gates are provided with interrogation or actuation pulses in a cyclic and sequential manner, as indicated by a selector arm V of scanning selector AWM, which scans the inputs *ab* of matrix AM. As a result of this scanning operation, the control pulses appear at the outputs of the individual coincidence gates which are simultaneously provided with signals. These so-controlled pulses are supplied over common output line *e* to evaluating connecting link AS1.

The signal lines connected to scanning matrix AM are scanned in synchronism with the scanning of the corresponding memory elements of the storage unit MSP, there being two memory elements for each signal line. The information contents of the memory elements are fed in this scanning operation over selector arms I and II of scanning selector AWM, to evaluating connecting link AS1. Input *m*1 of link AS1 designates the last-ascertained line condition, whereas input *m*2 designates the line condition ascertained prior to said last-ascertained line condition. That is, the storage elements scanned by arm I store the signal condition most recently ascertained for the corresponding line while the elements scanned by arm II store the signal condition during the previous scanning cycle.

The structure of link AS1 comprises logic circuit elements which are themselves known. They include blocking or AND gates S1–S3, OR gate M1, and AND gates S4 and S5. However, each of the AND gates has at least one input line terminated by a large dot, indicating that the inverse of the respective input is effective in the coincidence function. For instance, if a scanning pulse appears on line *e*, indicating that the signal line then being scanned has a signal pulse thereon at that time, AND gate S1 may furnish an output (if an output voltage is available at *m*1, but not at *m*2), but S3 cannot furnish an output.

Figures 2, 3:
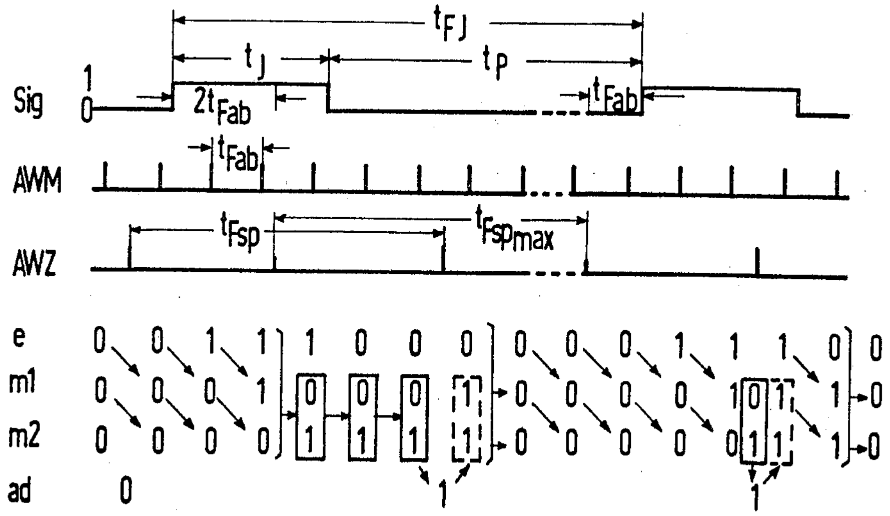
FIG. 2 is a pulse diagram representing the use of a "Last Look" operation extending over three scanning cycles, and the nonsynchronous evaluation of the line monitoring and registering operations.
FIG. 3 is a logic-plan diagram for evaluating circuit means employed in the arrangement according to FIG. 1.

The function of the combination of logic elements will now be explained with reference to the logic-plan diagram of FIG. 3. In FIG 3, rows numbered 1–4 show the various combinations of binary outputs (in the form of a voltage indicating a binary "1" and an absence of voltage indicating a binary "0") on lines *m*1 and *m*2, when there is no signal voltage on the signal line being scanned *e*="0"). Rows 5–8 show the same combinations when a scanning pulse is present on line *e* indicating the presence of signal voltage on the line being scanned (*e*="1"). The output lines *a*1 and *a*2 of the logic link AS1 provide the voltages indicated under those legends for the various columns shown, by reason of the gate combinations shown. For instance, when column 7 applies, gate S1 blocks gate S4, so that *a*1 exhibits a "0" but gate S1 also operates gate S5 (S3 being blocked by *e*) through OR gate M1, so that *a*2 exhibits a "1." The outputs *a*1 and *a*2 are stored in the memory elements of storage unit MSP corresponding to the line then being scanned, but operation of selector arms III and IV, which are synchronized with the other switch arms. (While switch arms are indicated, this is only for simplicity's sake, and it will be understood that electronic switches might well be used for these purposes.)

The condition indicated by column 7 of course is that the signal line *Sig* then being scanned has a signal pulse thereon, that the same line similarly had a pulse thereon in the last scanning cycle, but not in the next to last scanning cycle, so that the digit combination "0–1," representing a registration instruction, is properly stored in the respective line memory elements of storage unit MSP.

As the gate S1 "monitors" the signal line *e*, the gate S2 monitors previous storage of registration instructions, indicated by the *m*1=0, *m*2=1 condition shown in each of rows 2 and 6 of FIG. 3. In such case, gate S2 forecloses operation of gate S4, but causes operation of gate S5 (since gate S3 is blocked by the "0" at *m*1), to cause the same registration instructions to be stored again.

$$t_{Fsp\ max}=t_{FJ}-3t_{Fab}$$

Furthermore, if noise pulses must be taken into consideration, that is, if there is danger that the last scanning pulse, which falls into an interval, coincides with a noise pulse, the permissible cycle duration $t_{Fsp\ max}$ of the recording device must be reduced by the duration $t_{Fab}$ of a further scanning cycle. Otherwise, the above mentioned coincidence would cause the loss of the scanning result "0" which is necessary for recognition of a signal pulse and the following signal pulse would not be identified. Corresponding considerations apply if the trailing edges of pulses are evaluated as signal pulses to be registered, and if negative noise pulses occur which would divide the signal pulses, unless means are provided which render such noise pulses harmless. It would, for example, be possible to generate the scanning pulses as double pulses, or to reduce the time-spacing of the scanning pulses for monitoring of the lines.

Evaluating connecting link AS of FIG. 4 is essentially distinguished from that of FIG. 1, by an additional signal input *z* which indicates that the line information, corresponding to the signal line just being scanned, is also just ready for processing, so that a registration instruction previously stored, or resulting from the last ascertained line status, can be directly fed through output *ad* to the recording device.

The result of the above method is a modified operation of the evaluating link AS. Such modified operation is represented by the logic-plan of FIG. 5. Blocking or AND gate S1 monitors, in accordance with columns 7 and 15, the presence of a new signal pulse to be registered. Further, blocking gate S1 causes, through mixing OR gate M1 and blocking AND gate S4, and by blocking gate S6, as well as through mixing OR gate M2, that the digit combination "0–1" representing a registration instruction, is stored via outputs *a*1 and *a*2 in the respective line memory elements of tracks *m*1, *m*2 of drum storage SP, unless there is simultaneously present a retrieving instruction at input *z*. In this instance, blocking gate S4 is blocked and in accordance with column 15 of the logic plan of FIG. 5, a further adding instruction is produced at output *ad* through coincidence gate K1.

Blocking gate S2 monitors, in accordance with columns 2, 6, 10 and 14 of the logic-plan of FIG. 5, whether a digit combination representing a registration instruction ("0–1" at *m*1–*m*2) has been stored. Blocking gate S2 re-stores the digit combination which represents a registration instruction, through gate M1, blocking gate S4, and mixing gate M2 while blocking gate S6 is blocked, unless a retrieve instruction is simultaneously effective at input *z*. In such instance an adding instruction is produced at output *ad* through coincidence gate K1, in accordance with columns 10 and 14 of the logic-plan of FIG. 5. If in addition, the signal "1" is present on line *e*—which is checked by means of coincidence gate K2—then the information shifting of the "Last-Look" method is modified, and a signal is produced at output *a*2 through mixing gate M2. As a result, outputs *a*1 and *a*2 present the total digit combination "1—1."

In accordance with columns 3, 4, 11 and 12 of the logic plan of FIG. 5, blocking gate S3 monitors the occurrence of a digit combination representing a registration instruction during normal line monitoring. Furthermore, blocking gate S3 blocks blocking gate S5 so that, instead of the digit combination "1–0" which simulates a signal pulse, the digit combination "0—0" appears at outputs *a*1 and *a*2, thus indicating the continuance of an already recognized line condition. In all other instances, the signals occurring on line 3 are directly fed through blocking gate S6 to output *a*1, whereas instructions occurring at input *m*1 are directly fed through blocking gate S5 and mixing gate M2 to output *a*2 in accordance with the "Last-Look" method.

Regarding the pulse diagram of FIG. 2, the above described evaluating logic would involve the following modification; upon the occurrence of an add instruction at output *ad*, the digit combination "0—0" resulting from performing the "Last-Look" methods would be stored, instead of the digit combination "1—1."

FIG. 6 illustrates a respectively modified pulse diagram. The top pulse curve represents again the signal voltage occurring on any given signal line *Sig*. Then follow the scanning pulse train of scanning device AW, whose retrieving pulses are fed to input *z* of evaluating circuit AS to retrieve the registration instructions which have been temporarily stored in the respective line memory elements and which are ready for retrieval, as well as the input signals which are ready for evaluation and appearing on line *e* and on inputs *m*1 and *m*2 of evaluating circuit AS. The last row in FIG. 6 represents the adding instructions appearing at output *ad* of circuit AS.

As long as the monitored signal line is in signal status "0," a scanning pulse causes a "0"—representing signal to appear as a result on line *e*. When the signal line is in signal status "1," the result on line *e is* a "1"—representing signal. After the fourth scanning cycle, the digit combination which causes a registration instruction is fulfilled in analogy to column 7 of the logic-plan of FIG. 5. Accordingly, as a modification of the "Last-Look" principle, the digit combination "1–0," which is not required for recognizing a signal pulse, is stored in the individual line memory elements. This combination is preserved until, during the eighth pulse for scanning the lines, the recording device performs the scanning which results in the adding instruction "1"; see the above description of FIG. 3.

Thereafter, the "Last-Look" principle will be fully performed until again a digit combination is present which causes a registration signal in accordance with column 15 of the logic-plan of FIG. 5. Such digit combination occurs when the second scanning pulse falls within the following signal pulse, while the recording device simultaneously performs a scanning operation. The following digit combination "1—1" is preserved until the first scanning pulse which falls within a following pause has the result "0," thereby causing the complete erasure of the existing digit combination in accordance with column 4 of the logic-plan of FIG. 5.

Figure 7:
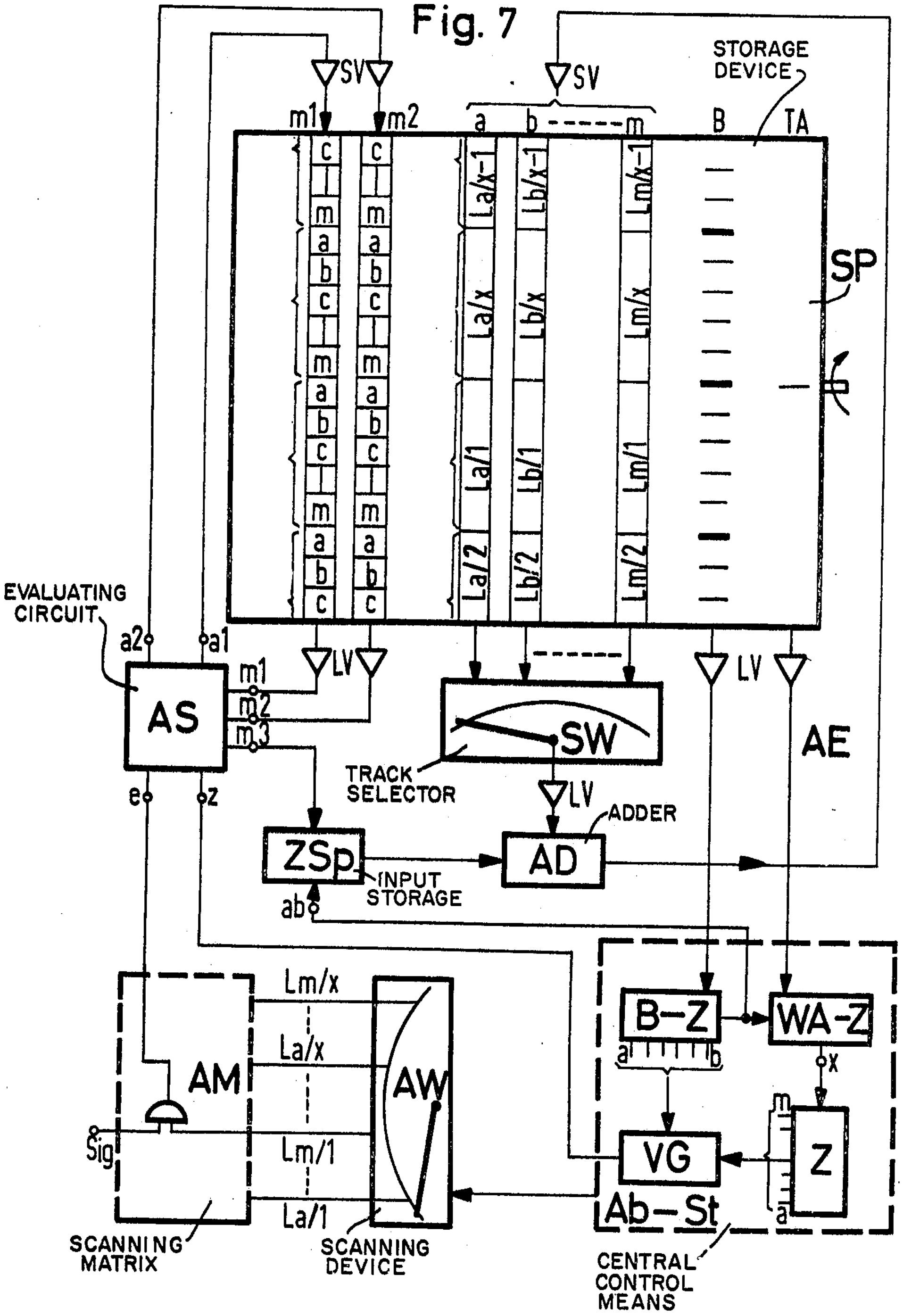
FIG. 7 is a circuit arrangement for performing the method of the invention without a special scanning device, as provided in FIG. 1, but in accordance with the evaluating logic according to FIGS. 4 to 6.

FIG. 7 shows in its lower left part a scanning matrix AM. Scanning device AW interrogates the coincidence gates provides for individual signal lines *La*/1 to *Lm*/*x*. The control signals which occur at the outputs of the respective gates during the activation thereof are fed through line *e* to evaluating circuit AS, similarly as in FIG. 4.

The upper part of FIG. 7 shows common storage device SP for the temporary storage of the line conditions required for performing the "Last-Look" method, on the identified registration instructions, as well as for the information content of each individual line. Storage device SP is a drum storage in the shown embodiment. The drum has a plurality of endless storage tracks extending around the circumference of the drum. Storage tracks *m*1 and *m*2 are provided for storage of the line conditions as they are identified upon each line, and for storage of the registration instructions. Tracks *a* to *m* are provided for storage of the information contained on each individual line. Tracks B and TA are timing tracks for marketing, or designating, the individual memory elements within a track, as well as for marking the beginning of a track on the drum. The markings which designate the beginning of a track, control (through central control means A*b*–S*t*) the cooperation of the individual information cycles, and assure the synchronism between scanning device AW and the rotation of the storage drum.

Information circulating circuits closed in themselves are provided for the individual line information memory elements which store the status of the lines and the registration instructions, and for the information on each individual line. The first mentioned circulating circuit is closed through evaluating link AS, whereas the latter is closed through track selector SW and adder AD. The information circulating circuit comprising track selector SW and adder AD forms recording device AE for recording the signal pulses appearing on the individual lines. Both information circulating circuits are coupled with each other through input storage ZS*p* which serves to feed registration instructions identified by evaluating link AS to adder AD.

According to the invention, the allocation of the storage tracks to the memory elements and to the information words is accomplished in the following manner: If a word length requires *m* storage elements for each information word of a line, in tracks *a* to *m*, then it is possible to place in tracks *m*1 and *m*2 for each word length the line memory elements of a total of *m* signal lines. The signal lines which can be combined in the above manner each form a group, and the corresponding information words are arranged side by side in different storage tracks *a* to *m*. If it is assumed that the word beginnings of all information words have the same phase position relative to each other in the individual storage tracks, and that each storage track comprises a total of $x$ information words, then the memory elements of the signal lines forming a group, are arranged to lead, relative to the corresponding line informations, by one word length each.

In view of the above, line information forming the word $x-1$ for signal lines $L/x-1$ to $Lm/x-1$, are arranged for example, in the same position or level as the line memory elements of the cyclically following line group $La/x$ to $Lm/x$ etc. It follows that the contents of the memory elements in tracks $m1$ and $m2$ have already been retrieved when the line information of one of tracks $a$ to $m$ is about to be retrieved in the course of a processing cycle. Accordingly, such contents are available through input storage ZS*p* for processing in a respective processing circuit.

During a processing cycle, the information on lines $La/1$ to $La/x$ of track $a$, is first retrieved for information processing. The line information on signal lines $Lb/1$ to $Lb/x$ of track $b$ follow next, etc. until the line information on signal lines $Lm/1$ to $Lm/x$ of track $m$ have been retrieved. As long as line information on track $a$ stand ready for information processing, registration instructions contained in the memory elements $a'$ of tracks $m1$ and $m2$ will be released for channelling to input storage ZS*p* under the control of control instructions on a control line which is connected to input $z$ of evaluating circuit member AS.

Subsequently, as soon as line information contained in track $b$ is ready for processing in the course of the processing cycle, registration instructions contained in memory elements of tracks $m1$ and $m2$ will be channelled etc., until the last of the registration instructions contained in memory elements are ready for retrieval.

The scanning of the individual signal lines is performed similarly to the above described procedure, by scanning device AW, however, not in the direction of the retrieval but perpendicularly thereto. Thus, signal lines $La/1$ to $Lm/1$ will be scanned first, then signal lines $La/2$ to $Lm/2$ etc. until the last line group $La/x$ to $Lm/x$ has been scanned.

Central control apparatus A*b*–S*t* determines which registration instruction is to be retrieved in the course of the information circulation for monitoring of the lines. Such determination is accomplished by the time sequence of the control pulses on the control line which is connected to input $z$ of evaluating circuit link AS. Central control apparatus A*b*–S*t* comprises, for this purpose, three cyclically operating counters of which counter B–Z counts the memory elements occupied by a storage word in response to direct control by timing track B of drum storage SP. Counter WA–Z is a word-begin-counter which is stepped by one step for each initiation of a counting cycle. Word-begin-counter WA–Z, upon reaching its end position, cyclically steps a further counter over its output $x$. Both counters B–Z and Z each comprises a number of outputs $a''$ to $m''$, which number corresponds to the number of memory elements per word. These outputs are coupled with each other through comparing circuit VG.

Each time when counter B–Z reaches the counting position which is marked or indicated by counter Z, a control instruction is produced at the output of comparing circuit VG. In response to such a control instruction a registration instruction is channelled to input storage apparatus ZS*p* from output *ad* of evaluating circuit AS. However, the registration instruction is temporarily stored until the beginning of a new storage word is marked through stepping of word-begin-counter WA–Z by counter BZ. For this purpose, the stepping instruction to word-begin-counter WA–Z is also channelled to input *ab* of input storage ZS*p*, thus effecting the erasure of the adding instruction in storage ZS*p* and its transfer to adder AD. In this way it is arranged that input storage ZS*p* is ready for receiving a subsequent registering instruction, upon initiation of a new storage word.

With the exception of evaluating circuit member AS which has been described in conjunction with FIG. 4, the details of the individual circuit means required for performing the present method are optional, provided these means are capable of performing the described functions. The scope of the invention is not dependent upon whether scanning device AW operates continuously, or whether it is arranged that input storage ZS*p* is ready for receiving a respective first incoming signal pulse and stopped when no further signal pulse is present. Instead of a drum storage it is also possible to use a cyclically operating magnetic core memory.

In view of the above, it is to be understood that the invention is not limited to the particular embodiments and features described and shown, but that it comprises any modifications and equivalents within the scope of the appended claims.

I claim:

1. In a method for registering signal pulses occurring on a plurality of signal lines in a random sequence, comprising the steps of periodically scanning with a given frequency the signal lines to recognize their signal status, identifying the signal pulses by comparing results of at least three successive line scanning cycles, feeding the identified signal pulses to respective storage elements provided for each line to set those elements to conditions storing the signal pulses, periodically scanning all storage elements at a frequency less than said given frequency to recognize stored signal pulses in said storage elements, resetting the storage elements to produce control pulses in response to signal pulses stored in said storage elements, feeding the control pulses to a central recording device, the improvement comprising, upon recognition of a signal pulse stored in the storage elements (MSP), temporarily keeping stored therein one digit combination (e.g. "0–1") of two possible digit combinations ("0–1" or "1–0") possible for said recognition of stored signal pulses, until registration of the signal pulse by said central recording device;

and, upon occurrence of said one digit combination during said scanning of the signal lines, storing a digit combination which signifies continuation of the signal status (e.g. "0—0").

2. The method of claim 1, including the steps of separately scanning said storage elements to monitor the signal status of the lines, and to register signal pulses stored in said storage elements, the improvement comprising, performing said line monitoring scanning operation in scanning cycles each having a given duration, extending a line monitoring last-look over $n$ scanning cycles by comparison of the results thereof, and operating said central recording device for scanning in cycles each having a period which is smaller than a time corresponding to a minimum time spacing between signal pulses, decreased by said $n$ scanning cycles of said given duration.

3. The method of claim 2 including the steps of evaluating for registration the leading edges of said signal pulses, erasing a digit combination signifying a leading edge, (e.g. "1–0"), upon scanning by said central recording device, and replacing said erased digit combination by a digit combination (e.g. "1—1") signifying a continuance of a signal pulse.

4. The method of claim 2 including the steps of evaluating for registration the trailing edges of said signal pulses, erasing a digit combination signifying a trailing edge (e.g. "0–1), upon scanning by said central recording device, and replacing said erased digit combination by a digit combination (e.g. "0—0") signifying an interval between two signal pulses.

5. The method of claim 1 in which the information contained in said storage elements is evaluated to monitor the lines and register the signal pulses, the improvement comprising, performing said evaluating steps in synchronism with each other, performing said evaluating line monitoring in scanning cycles having a given duration;

extending a line monitoring last-look operation over $n$ scanning cycles by comparison of the results thereof, and operating said central recording device for scanning in cycles each having a period which is smaller than a time corresponding to a minimum time spacing between signal pulses, decreased by said $n-1$ scanning cycles of said given duration.

6. The method of claim 1 comprising the steps of dividing the signal lines to be monitored and the corresponding storage elements into a number of groups, cyclically scanning for monitoring purposes the lines of a given group during a given time span, operating said central recording device for processing a single registration instruction in a time corresponding to said given time span for scanning the lines of a group, assigning designations to the lines comprised in each group, assigning information words to the lines of like designation in all groups, dividing said information words into word groups, each word group comprising a number of information words corresponding to said number of line groups, evaluating one word group during each cyclical scanning of all line groups so that during scanning of the penultimate information word of a word group the last line group is being scanned, upon occurrence of a registration instruction for an information word subsequently to be processed, erasing such registration instruction during the scanning of the corresponding signal line, and feeding said registration instruction to an input storage of said central recording device for temporarily storing said registration instruction until an impending information processing operation begins.

7. The method of claim 6 comprising the step of directly feeding said registration instruction to said input storage of the central recording device if said subsequently-to-be-processed information word happens to be the information word assigned to the line just being scanned.

8. The method of claim 6 including the steps of stepping one counter in synchronism with the scanning of the individual signal lines, stepping another counter at the beginning of the scanning of the last group of lines, generating a control instruction in response to equal counts of the two counters, and controlling said feeding of the registering instruction to the input storage of said central recording device by said control instruction.

9. Apparatus for the registration of signal pulses appearing on signal lines in random succession, but at a certain minimum time interval, which pulses have a certain minimum length, such as charge pulses in telephone installations, through periodic testing of the signal lines with regard to their signaling state, and identifying the signal pulses according to the last-look principle, by comparing the scanning results of at least three successive scanning cycles, wherein the so-identified signal pulses are in each case conveyed to a line-individual storage element, to set the element to a signal-indicating condition; and all storage elements are also scanned, periodically, in succession, but at a larger time interval than the signal line, and are reset and whereby only the control pulses released upon resetting the set storage elements are conveyed to the central recording system as registration commands, characterized by the fact that the line-individual storage elements (*m*1, *m*2) for the intermediate storage of the registration commands identified during the line testing period, are the same storage elements provided for the intermediate storage of the scanning results required within the last-look process, and that these storage elements are coupled over selection switching devices (AWM channel I, II or III, IV, respectively) which make possible the cyclic circulation of the information contained therein, with an evaluation switching link (AS1 or AS) consisting of logical components, which link, in addition to the components carrying out the last-look operation, includes further components so controlling the output signals upon the recognition of the signal pulse, that, in modification of the last-look process, upon recognition of the signal pulse, in each case that combination which makes possible recognition of a signal pulse (e.g. "0–1" or "1–0") marks the not-used combination (e.g. "1–0") until the final processing by the recording system to record the signal pulse, and upon the appearance of this combination during the line testing operation, the combination identifying continuation of the signal status (e.g., "0—0") is marked at the signal outlets.

10. Apparatus according to claim 9, with separate control of the line-individual storage elements for line testing and for registration through two different selector systems, characterized by the fact that in the case of a last-look for line testing extending over $n$ scanning cycles, the cycle time ($t_{FSP}$) of the recording system is shorter than the minimum pulse succession time ($t_{FJ}$) reduced by $n$ scanning cycles for line testing, of the signal pulses to be registered.

11. Apparatus according to claim 10, characterized by the fact that there is included in the coupling circuit between the line-individual storage elements and the central recording system (AD, ZSP) a control switching link (AS2) consisting of logical components, which in addition to the command outlet (*ad*) for the recording system, includes additional signal outlets (*a*1' and *a*2') which make possible simultaneous storage in the scanned storage elements, so that upon evaluation of the leading edges of the signal pulses as signal pulses to be registered, the signal combination indicating a signal pulse to be registered and canceled upon the scanning operation by the central recording system (e.g. "1–0") is replaced by the signal combination identifying the continuation of a signal pulse ("1—1").

12. Apparatus according to claim 10, characterized by the fact that the coupling circuit between the line-individual storage elements and the central recording system includes signal outlets (e.g. *a*1' and *a*2') which make possible separate simultaneous storage in the scanned storage elements, so that upon evaluation of the trailing edges of the signal pulses to be registered, the signal combination ("0—1") indicating a signal pulse to be registered and canceled upon scanning by the central recording system, is replaced by the signal combination ("0—0") identifying the continuation of the interval between two signal pulses.

13. Apparatus according to claim 9, having synchronous evaluation of the information contained in the line-individual storage elements for line supervision and the registration, by a single selector system, characterized by the fact that in the case of a last-look operation for line supervision, extending over $n$ scanning cycles, the cycle time ($t_{Fsp}$) of the recording system is shorter than the minimum pulse succession time, reduced by $n-1$ scanning cycles of the signal pulses to be recorded.

14. The apparatus according to claim 13, characterized by the fact, that the evaluation connecting link (AS) serving for line testing has an additional control inlet (*z*) indicating the simultaneous processing of the thereto pertaining line information, and thus effecting the direct forwarding of an already stored or just ascertained registration command, an additional command outlet (*ad*) for the recording system (AE) as well as further logical components, so that upon forwarding of a registration command there is marked at the signal outlet (*a*1, *a*2) for controlling the line-individual storage elements (*m*1, *m*2) in each case the result combination resulting from the last-look operation (e.g. "0—0" or "1—1").

15. The apparatus according to claim 14 for the processing of the registration commands identified as a consequence of periodic testing of signal lines concerning their signal state in accordance with the last-look principle and temporarily stored in the line-individual storage elements, by a central recording system which is not synchronously operating with the line testing operation, characterized by the fact that the signal lines to be supervised and the thereto-assigned storage elements for the intermediate storage of the scanning results in said line supervision operation, as well as the registration commands, are subdivided into groups ($1-x$), and that the time required for the processing of a single registration command by the recording system (AE) equals the time necessary for the supervision of the number (e.g., *m*) of signal lines (e.g. *La*/1–*Lm*/1) combined in a group, that the information words assigned to equally-designated lines (e.g. L*a*/ . . . or L*p*/ . . . etc. to L*m* . . .) within each group ($1-x$) are also subdivided into groups (*a–m*) with a number of information words, (eg. *La*/1–*La*/*x*) which corresponds to the number (*x*) of the line groups, so that upon the cyclic scanning of all line groups ($1-x$) in each case one of the word groups (*a–m*) is evaluated in sequence and that during the processing of the $x-1$th information word, in each case, of a word group, (e.g., *a*), the *x*th line group is supervised.

16. The apparatus according to claim 15, characterized by the fact that there is included between the command outlet (*ad*) of the evaluation switching link (AS) and the recording system (*AD*/*AE*) an intermediate storage means (ZS*p*) so that a recording command which is already present or which is identified upon the scanning of a signal line, is conveyed to the intermediate storage means for an information word (e.g. *La*/*x*) to be processed subsequently, and remains temporarily stored therein until the beginning of the processing of that information by the recording system.

17. Apparatus according to claim 16, characterized by the fact, that the additional control inlet (*z*) of the evaluation connecting link (AS) effecting the forwarding of the identified recording commands to the recording system, is connected with the outlet of a comparator (VG), that the inlets of the comparator on the one hand are connected with the outlets of a meter mechanism (B–Z) which can be switched forward synchronously with the scanning of the individual signal lines within each line group, and on the other hand with the outlets of a second meter mechanism (Z) which in each case can only be switched forward at the beginning of the scanning of the last line group, and that both meter mechanisms possess a number of outlets (*a–m*) corresponding to the number (*m*) of the signal lines per group.

References Cited

UNITED STATES PATENTS

| | | | |
|---|---|---|---|
| 3,342,939 | 9/1967 | Gattner et al. | 179—7.1 |
| 3,342,940 | 9/1967 | Gattner et al. | 179—9 |

KATHLEEN H. CLAFFY, Primary Examiner

JAN S. BLACK, Assistant Examiner